(12) United States Patent  
Okano

(10) Patent No.: US 9,760,814 B2  
(45) Date of Patent: Sep. 12, 2017

(54) IMAGE FORMING APPARATUS FOR PROCESSING DRAWING DATA DESCRIBED IN PAGE DESCRIPTION LANGUAGE

(71) Applicant: RISO KAGAKU CORPORATION, Tokyo (JP)

(72) Inventor: Kazuhisa Okano, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/283,680

(22) Filed: Oct. 3, 2016

(65) Prior Publication Data

US 2017/0124436 A1 May 4, 2017

(30) Foreign Application Priority Data

Oct. 29, 2015 (JP) ................................. 2015-213007

(51) Int. Cl.
  *G06F 3/12* (2006.01)
  *G06K 15/02* (2006.01)
  *G06K 15/10* (2006.01)

(52) U.S. Cl.
  CPC ....... *G06K 15/1857* (2013.01); *G06K 15/102* (2013.01); *G06K 15/1802* (2013.01); *G06K 15/1809* (2013.01); *G06K 15/1813* (2013.01); *G06K 15/1822* (2013.01); *G06K 2215/0011* (2013.01); *G06K 2215/0094* (2013.01); *G06K 2215/101* (2013.01)

(58) Field of Classification Search
  None
  See application file for complete search history.

(56) References Cited

U.S. PATENT DOCUMENTS

| 6,184,860 | B1* | 2/2001 | Yamakawa | G06F 3/04842 715/823 |
| 6,456,298 | B1* | 9/2002 | Kunimasa | G06K 15/02 345/418 |
| 7,787,707 | B2* | 8/2010 | Miyata | H04N 1/40068 345/562 |
| 2002/0051016 | A1* | 5/2002 | Moriwaki | G06T 3/60 715/765 |
| 2007/0124567 | A1* | 5/2007 | Tomita | G06F 15/167 712/220 |

(Continued)

FOREIGN PATENT DOCUMENTS

JP 4614389 1/2011

*Primary Examiner* — Henok A Shiferaw  
(74) *Attorney, Agent, or Firm* — Greenblum & Bernstein, P.L.C.

(57) ABSTRACT

An image forming apparatus: upon determining that OR drawing of a first drawing object and a second drawing object included in received drawing data is not possible, drives one of a plurality of arithmetic processors to sequentially execute a first drawing process of the first drawing object and a second drawing process of the second drawing object in an original order of the first drawing object and the second drawing object in commands of the received drawing data; and, upon determining that the OR drawing is possible, distributes and assigns the first drawing process and the second drawing process to two or more of the plurality of arithmetic processors and drives the two or more arithmetic processors to execute the first drawing process and the second drawing process in parallel.

7 Claims, 8 Drawing Sheets

(56) References Cited

U.S. PATENT DOCUMENTS

| | | | |
|---|---|---|---|
| 2010/0238177 A1* | 9/2010 | Igarashi | G06T 11/60 |
| | | | 345/441 |
| 2010/0238464 A1* | 9/2010 | Tanimoto | G06K 15/02 |
| | | | 358/1.9 |
| 2011/0038004 A1* | 2/2011 | Oishi | G06K 15/1826 |
| | | | 358/1.15 |

* cited by examiner

FIG. 2
```
<OWNER>                    OwnerA
<JOB NAME>                 Job1234
<OR FLAG>                    1
<VERTICAL POSITION 1>      START POINT(Y)=
<HORIZONTAL POSITION 1>    START POINT(X)=
<DRAWING AREA 1>           WIDTH(W)=    ,HEIGHT(H)=
<obj1>                           A               ··· ■
<VERTICAL POSITION 2>      START POINT(Y)=
<HORIZONTAL POSITION 2>    START POINT(X)=
<DRAWING AREA 2>           WIDTH(W)=    ,HEIGHT(H)=
<obj2>                           B               ··· △
        ⋮                         ⋮
```
FIG. 3A
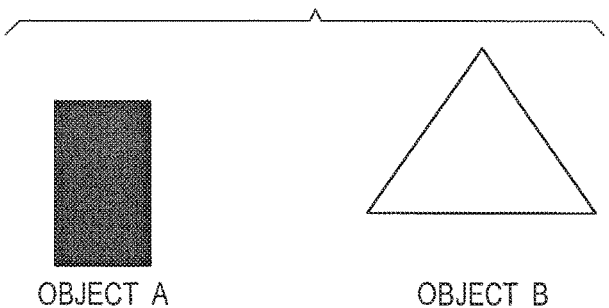
OBJECT A          OBJECT B
FIG. 3B
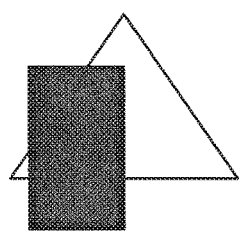
FIG. 3C
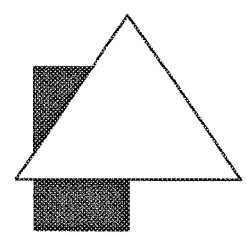

FIG. 6

| <OWNER> | OwnerA |
| <JOB NAME> | Job1234 |
| <VERTICAL POSITION 1> | START POINT(Y)=n |
| <obj1> | COMPRESSED DATA OF ONE LINE |
| <VERTICAL POSITION 2> | START POINT(Y)=n−1 |
| <obj2> | COMPRESSED DATA OF ONE LINE |
| ⋮ | ⋮ |

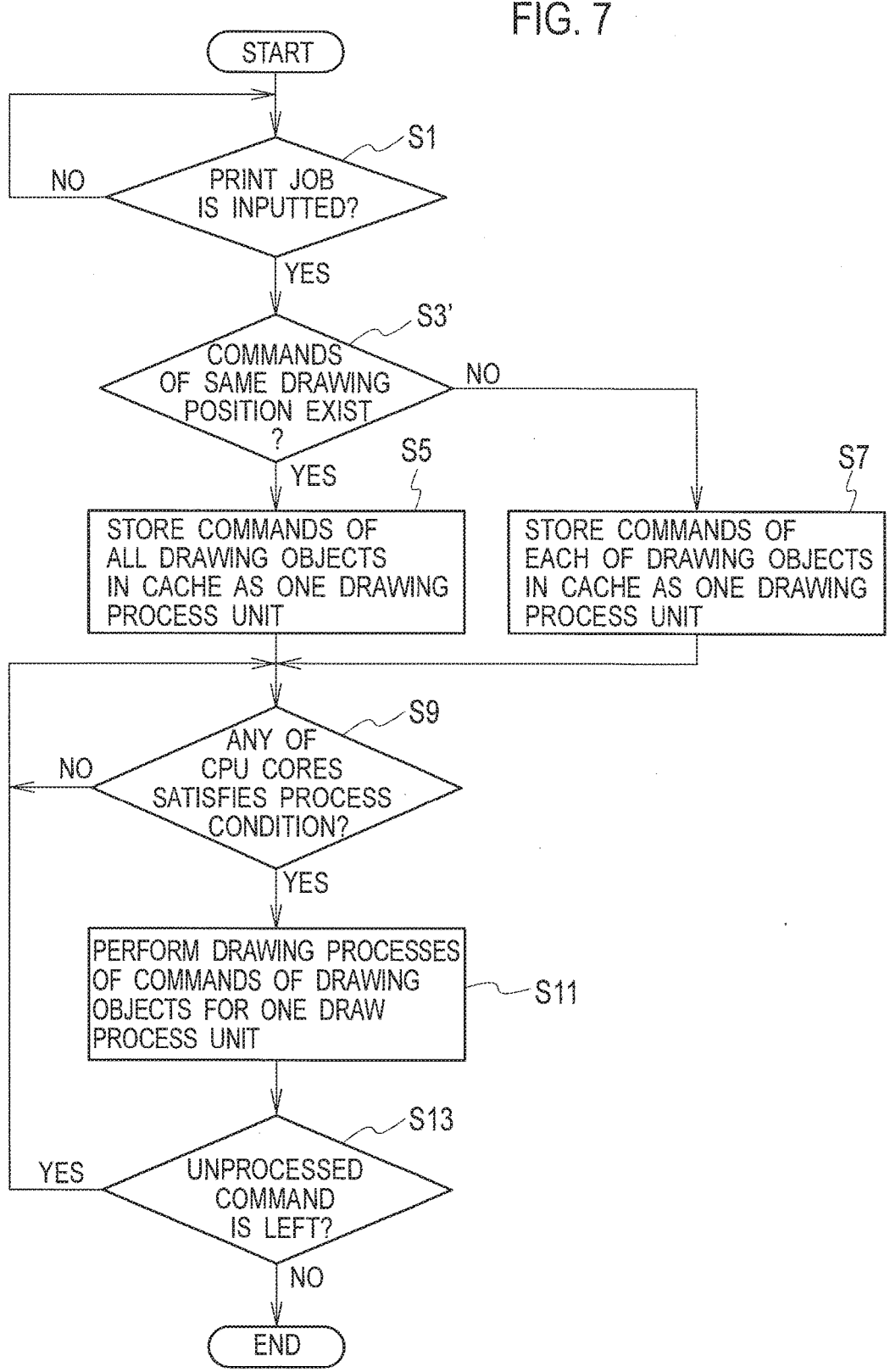

FIG. 8

```
<OWNER> OwnerA
<JOB NAME> Job1234
<PAGE NUMBER> FIRST PAGE
<COLOR TYPE> MAGENTA
<RESOLUTION> 300x600
<VERTICAL POSITION 1>     START_POINT(Y)=
<HORIZONTAL POSITION 1> START_POINT(X)=
<DRAWING AREA 1>          WIDTH(W)= , HEIGHT(H)=
<obj1> ■
    ⋮
<VERTICAL POSITION n>     START_POINT(Y)=
<HORIZONTAL POSITION n> START_POINT(X)=
<DRAWING AREA n>          WIDTH(W)= , HEIGHT(H)=
<objn> ○
<COLOR TYPE> YELLOW
<RESOLUTION> 300x600
<VERTICAL POSITION 1>     START_POINT(Y)=
<HORIZONTAL POSITION 1> START_POINT(X)=
<DRAWING AREA 1>          WIDTH(W)= , HEIGHT(H)=
<obj1> ◆
    ⋮
<VERTICAL POSITION n>     START_POINT(Y)=
<HORIZONTAL POSITION n> START_POINT(X)=
<DRAWING AREA n>          WIDTH(W)= , HEIGHT(H)=
<objn> ▲
<COLOR TYPE> CYAN
<RESOLUTION> 300x600
<VERTICAL POSITION 1>     START_POINT(Y)=
<HORIZONTAL POSITION 1> START_POINT(X)=
<DRAWING AREA 1>          WIDTH(W)= , HEIGHT(H)=
<obj1> △
    ⋮
<VERTICAL POSITION n>     START_POINT(Y)=
<HORIZONTAL POSITION n> START_POINT(X)=
<DRAWING AREA n>          WIDTH(W)= , HEIGHT(H)=
<objn> ○
<COLOR TYPE> BLACK
<RESOLUTION> 600x600
<VERTICAL POSITION 1>     START_POINT(Y)=
<HORIZONTAL POSITION 1> START_POINT(X)=
<DRAWING AREA 1>          WIDTH(W)= , HEIGHT(H)=
<obj1> ◇
    ⋮
<VERTICAL POSITION n>     START_POINT(Y)=
<HORIZONTAL POSITION n> START_POINT(X)=
<DRAWING AREA n>          WIDTH(W)= , HEIGHT(H)=
<objn> □
<PAGE NUMBER> SECOND PAGE
<COLOR TYPE> MAGENTA
<RESOLUTION> 300x600
<VERTICAL POSITION 1>     START_POINT(Y)=
<HORIZONTAL POSITION 1> START_POINT(X)=
<DRAWING AREA 1>          WIDTH(W)= , HEIGHT(H)=
<obj1> ●
    ⋮
```

IMAGE FORMING APPARATUS FOR PROCESSING DRAWING DATA DESCRIBED IN PAGE DESCRIPTION LANGUAGE

CROSS REFERENCE TO RELATED APPLICATION

This application is based upon and claims the benefit of priority from the prior Japanese Patent Application No. 2015-213007/filed on Oct. 29, 2015, the entire contents of which are incorporated herein by reference.

BACKGROUND

1. Technical Field

The disclosure relates to an image forming apparatus which performs drawing processing according to drawing commands of drawing data described in a page description language (PDL).

2. Related Art

In order to increase the speed of drawing processing in an image forming apparatus which receives drawing data described in a page description language (PDL) from a client, it is effective to generate multiple drawing instructions by dividing the drawing data and cause multiple processors to simultaneously process the multiple drawing instructions in parallel.

Japanese Patent No. 4614389 proposes the following technique. The drawing data is divided into units of drawing objects. When there are drawing objects intersecting each other, the drawing instructions for these drawing objects are grouped and processed together. Meanwhile, when there are drawing objects not intersecting each other, the drawing instructions for these drawing objects are processed by separate processors in parallel.

SUMMARY

In the proposal described above, the image forming apparatus performs the intersection determination of the drawing objects by analyzing the inputted drawing data. Accordingly, even when the drawing instructions are processed by multiple processors in parallel, the speed of the drawing processing cannot be sufficiently increased due to a large processing burden of the intersection determination performed before the processing of the drawing instructions.

An object of the disclosure is to provide an image forming apparatus which can determine whether OR (logical addition) drawing of multiple drawing objects included in drawing data is possible without bearing a large processing burden.

An image forming apparatus in accordance with some embodiments includes: a processor having a plurality of arithmetic processors; and a memory including instructions that, when executed by the processor, cause the processor to perform operations. The operations include: receiving drawing data described in a page description language and including commands for a first drawing object and a second drawing object; determining whether OR drawing of the first drawing object and the second drawing object is possible, based on contents of the commands of the received drawing data; upon determining that the OR drawing is not possible, driving one of the plurality of arithmetic processors to sequentially execute a first drawing process of the first drawing object and a second drawing process of the second drawing object in an original order of the first drawing object and the second drawing object in the commands of the received drawing data; and upon determining that the OR drawing is possible, distributing and assigning the first drawing process and the second drawing process to two or more of the plurality of arithmetic processors and driving the two or more arithmetic processors to execute the first drawing process and the second drawing process in parallel.

In the configuration described above, the processor only needs to read the contents of the commands of the drawing data in the case of determining whether the OR drawing of the plurality of drawing objects included in the drawing data is possible, and does not have to analyze the read contents and bear a large processing burden. Accordingly, the processor can determine whether the OR drawing of the plurality of drawing objects included in the drawing data is possible without hearing a large processing burden. Hence, the processor can determine whether the OR drawing of the plurality of drawing objects included in the drawing data is possible without bearing the burden of a large processing amount, and increase the speed of the drawing processing for the plurality of drawing objects which can be subjected to the OR drawing, by dividing the drawing processes among the plurality of arithmetic processors and causing them to process the drawing processes in parallel.

The commands may include status information indicating whether the OR drawing of the first drawing object and the second drawing object is possible. The operations may include determining whether the OR drawing of the first drawing object and the second drawing object is possible, based on the status information.

In the configuration described above, when an output source of a print job of an image being a source of the drawing data generates data of the image by combining the plurality of drawing objects, the output source can determine whether the OR drawing of the drawing objects is possible based on the contents of the combination of the drawing objects and output the determination result by including the determination result in the print job as the status information.

Accordingly, the processor can determine whether the OR drawing of the plurality of drawing objects included in the drawing data is possible only by reading the status information included in the commands of the drawing data generated from the inputted print job, without bearing a large processing burden.

The commands may include drawing position information indicating a first drawing position of the first drawing object and a second drawing position of the second drawing object. The operations may include determining whether the OR drawing of the first drawing object and the second drawing object is possible, based on match or mismatch of the first drawing position and the second drawing position indicated in the drawing position information.

In this case, when the plurality of drawing objects indicated by the commands include drawing objects at the same drawing position, changing the drawing order of the drawing objects at the same drawing position may cause changes in contents of an image formed by the drawing.

In view of this, in the configuration described above, for example, when the processor recognizes that a plurality of drawing objects whose drawing positions match exist in the drawing data based on the drawing position information included in the commands of the drawing data, the processor determines that the OR drawing of the drawing objects indicated by the commands is impossible. Meanwhile, when the drawing positions of the drawing objects do not match at all (mismatch), the processor determines that the OR drawing of the drawing objects indicated by the commands is possible.

Accordingly, the processor can determine whether the OR drawing of the drawing objects is possible based on matching or mismatching of the drawing positions of the drawing objects indicated in the drawing position information, without bearing a large processing burden.

The operations may include, upon determining that the OR drawing is possible, assigning the first drawing process and the second drawing process to the two or more arithmetic processors such that a drawing process of the first drawing process and the second drawing process with a larger data amount is assigned to an arithmetic processor of the two or more arithmetic processors with a higher clock rate.

In the configuration described above, when the data amounts of the plurality of drawing objects which can be subjected to the OR drawing vary, the drawing process of the drawing object with a larger data amount is preferentially assigned to the arithmetic processor with a higher clock rate and a faster processing speed. Hence, it is possible to increase efficiency of the speed increase achieved by performing the drawing processes for the plurality of drawing objects in parallel with the plurality of arithmetic processors.

The first drawing object and the second drawing object may be drawing objects of different colors forming a color image. The operations may include, upon determining that the OR drawing is possible, assigning the first drawing process and the second drawing process to the two or more arithmetic processors such that a drawing process of the first drawing process and the second drawing process with a higher resolution is assigned to an arithmetic processor of the two or more arithmetic processors with a higher clock rate.

In the configuration described above, when the plurality of drawing objects which can be subjected to the OR drawing includes the drawing objects of different colors forming the color image and the resolutions of the drawing objects of different colors vary, the drawing process of the drawing object with a higher resolution is preferentially assigned to the arithmetic processor with a higher clock rate and a faster processing speed.

Hence, it is possible to increase the efficiency of the speed increase achieved by performing the drawing processes for the plurality of drawing objects in parallel with the plurality of arithmetic processors.

The operations may include assigning the first drawing process and the second drawing process preferentially to the two or more arithmetic processors in an ascending order of usage of the two or more arithmetic processors.

In the configuration described above, for example, causing the arithmetic processor whose usage is lower than a predetermined reference value and which has good operation efficiency to execute the drawing process for the drawing object indicated by the command can increase the efficiency of the speed increase achieved by performing the drawing processes for the plurality of drawing objects in parallel with the plurality of arithmetic processors.

The commands may include: drawing position information indicating a first drawing position of the first drawing object and a second drawing position of the second drawing object; and ink color information of the first drawing object and the second drawing object. The operations may include: determining whether the first drawing position and the second drawing position indicated in the drawing position information match; upon determining that the first drawing position and the second drawing position match, determining whether the first drawing object and the second drawing object are drawing objects of different colors forming a color image, based on the ink color information; and upon determining that the first drawing object and the second drawing object are the drawing objects of different colors, determining that the OR drawing is possible.

In the configuration described above, the processor can determine whether the OR drawing of the drawing objects of the different colors forming the color image is possible without bearing a large processing burden, and increase the speed of the drawing processing for the plurality of drawing objects which can be subjected to the OR drawing, by dividing the drawing processes among the plurality of arithmetic processors and causing them to process the drawing processes in parallel.

BRIEF DESCRIPTION OF DRAWINGS

FIG. 2 is an explanatory view depicting contents of a print job which is described in a PDL and which is outputted by a printer driver of a client in FIG. 1 to an inkjet recording apparatus.

FIGS. 3A to 3C are explanatory views illustrating an idea of OR drawing of drawing objects in FIG. 2.

FIG. 6 is an explanatory view depicting contents of a print job which is described in the PDL and which is outputted by the printer driver of the client in FIG. 1 to the inkjet recording apparatus in a second embodiment.

FIG. 7 is a flowchart depicting steps of a process performed by the CPU of the control unit in the inkjet recording apparatus upon receiving the print job with contents of FIG. 6 from the client of FIG. 1.

FIG. 8 is an explanatory view depicting contents of a print job of a color original image which is described in PDL and which is outputted by the printer driver of the client of FIG. 1 to the inkjet recording apparatus in a third embodiment.

DETAILED DESCRIPTION

Figure 1:
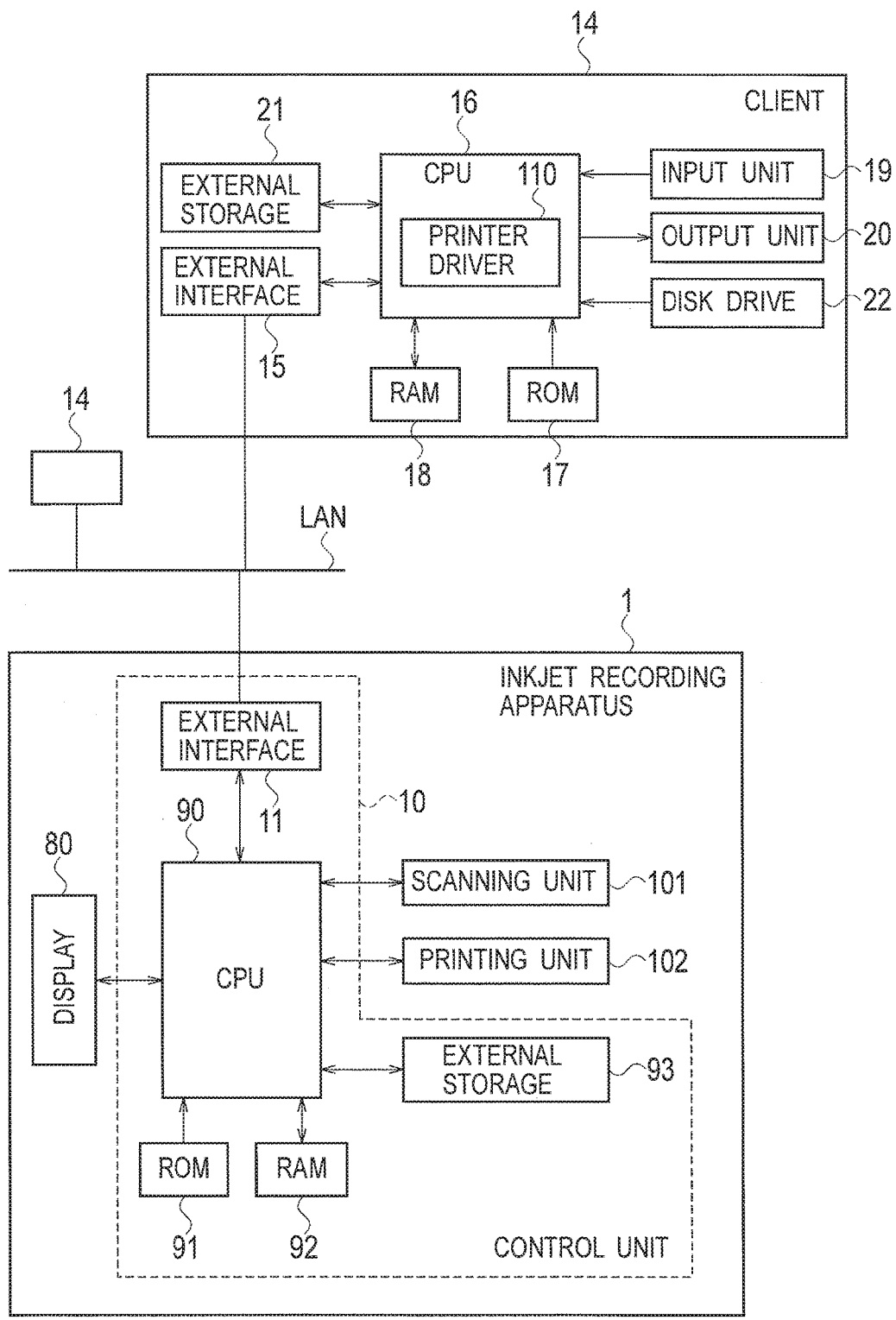
FIG. 1 is a block diagram illustrating a schematic configuration of a printer network system in a first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Embodiments of the present invention are described below with reference to the drawings.

First Embodiment

FIG. 1 is an explanatory view illustrating a schematic configuration of a printer network system in a first embodiment of the present invention. Note that an inkjet recording apparatus. In the first embodiment which is illustrated in FIG. 1 is assumed to be a line inkjet color printer.

Overall Configuration of Printer Network System

As illustrated in FIG. 1, the printer network system of the embodiment includes the inkjet recording apparatus 1 (image forming apparatus) and clients 14.

Configuration of Client

Each of the clients 14 is formed of a personal computer (PC) and the like. The client 14 includes a CPU 16 which executes various processes based on a control program stored in a ROM 17. A RAM 18 configured to function as a working area, an input unit 19 including a keyboard, a mouse, and the like, an output unit 20 including a liquid crystal display and the like, an external storage 21, and a disk drive 22 are connected to the CPU 16.

The external storage 21 has a storage region for an application program used to generate original data including print images of documents, images, and the like, a storage region for a printer driver program of the inkjet recording apparatus 1, and a storage region for other various application programs. The external storage 21 also has a database region. The original data generated by using the application program and similar data are stored in the database region.

The CPU 16 is an arithmetic device formed of a processor, a memory, and other peripheral devices, and activates the application program in the external storage 21 according to an activation request inputted from the input unit 19. Moreover, the CPU 16 generates the original data of an image on the activated application program by receiving inputs of parameters from the input unit 19. The generated original data is outputted to and displayed on the output unit 20. Moreover, when the CPU 16 receives a save request from the input unit 19, the generated original data is stored in the database region of the external storage 21.

The original data stored in the database region of the external storage 21 is read from the external storage 21 when the CPU 16 receives a read request from the input unit 19 while the application program is activated. The print image of the read original data can be outputted to and displayed on the output unit 20. Moreover, the print image can be processed on the application program to be regenerated into new original data.

When the CPU 16 receives a print request for the original data generated by using an original application program, a form creating application program, or the like, the CPU 16 virtually constructs a printer driver 110 by executing the printer driver program. Then, the printer driver 110 outputs a print job to the inkjet recording apparatus 1.

The printer driver 110 is a data conversion program to be executed on the client 14 to control the inkjet recording apparatus 1 connected to the client 14. The printer driver 110 obtains the original data including a print image generated by the original application program or the like and generates the print job according to predetermined print setting information. Then, the printer driver 110 outputs the generated print job from an external interface 15 to an external interface 11 of a control unit 10.

In this case, the print setting information is information required for normal printing such as, for example, the size or the original data, the resolution, the size of a print sheet, and the print direction. The print setting information also includes information relating to a print mode for printing the print image with the inkjet recording apparatus 1.

Print Job

FIG. 2 is an explanatory view depicting contents of the print job outputted by the printer driver 110 to the inkjet recording apparatus 1. The printer driver 110 of the embodiment outputs the print job described in a page description language (PDL) to the inkjet recording apparatus 1. As illustrated in FIG. 2, the print job includes commands of an owner, a job name, and an OR (logical addition) flag (status information) and, subsequent to these commands, repeatedly includes commands of a vertical position, a horizontal position, a drawing area, and obj (object), for each of objects.

The owner name is a user name of the client 14. The job name is a file name of the original data being a target of the print request for which the print job is generated. The vertical position is a position of a start point of drawing in the vertical direction (Y coordinate axis direction) of the drawing object. The horizontal position is a position of a start point of drawing in the horizontal direction (X coordinate axis direction) of the drawing object. The drawing area is the width (X coordinate axis direction) and the height (Y coordinate axis direction) of the drawing object. obj is data (raster or vector) of the drawing object forming the image of the original such as "curve" and symbols of "circle," "triangle," and "quadrilateral."

The OR flag is a flag indicating whether OR (logical addition) drawing of the drawing objects defined in the commands of obj is possible or not. The OR flag set to 1 means that the OR drawing is possible, and the OR flag set to 0 means that the OR drawing is impossible.

The OR drawing of the drawing objects is described with reference to the explanatory views of FIGS. 3A to 3C. For example, assume a case where an object A which is a black-solid rectangle elongating in a vertical direction and an object B which is a white equilateral triangle are provided as illustrated in FIG. 3A and, in an image obtained by overlapping these objects, a portion where the objects A and B overlap each other is to be drawn as a black-solid portion as illustrated in FIG. 3B.

In this case, in the image of FIG. 3B, the portion where the objects A and B overlap each other is drawn as the black-solid portion regardless of which one of the objects A and B is drawn first in OR (logical addition) calculation, and the contents of the image does not change. Accordingly, in the case of drawing the image of FIG. 3B, either of the drawing processes for the objects A and B may be performed first and the OR drawing is possible.

Meanwhile, assume a case where, in the image obtained by overlapping the objects A and B, the portion where the objects A and B overlap each other is to be drawn as a white portion as illustrated in FIG. 3C. In this case, in the image of FIG. 3O, the portion where the objects A and B overlap each other is drawn as the white portion when the drawing process of the object B is performed first. However, when the drawing process of the object. A is performed first, the overlapping portion is drawn as a black-solid portion and the contents of the image changes. Accordingly, in the image of FIG. 3C, the drawing process of the object A must be performed first, and the OR drawing is impossible in this case.

When the OR drawing is possible, the image of FIG. 3B can be drawn even if the order of the drawing processes for the objects A and B is changed. Meanwhile, when the OR drawing is impossible, the image of FIG. 3C cannot be drawn if the order of the drawing processes for the objects A and B are changed.

In view of this, in the embodiment, whether the order of the drawing processes for the objects A and B is fixed (cannot be changed) or arbitrary (can be changed) is indicated in the command of OR flag in the print job depicted in FIG. 2. Note that the OR flag is set to "1" when the OR drawing is possible and is set to "0" when the OR drawing is impossible.

Note that, in the embodiment, when the print request for the original data generated by using the original application program, the form creating application program, or the like is inputted, the printer driver 110 obtains the drawing objects forming the image of the original data and information on how to combine the drawing objects, from the application program.

The information indicates the order in which the objects are to be overlapped, which one of the objects is to be arranged in the foreground, and the like in the case where the image of the original data is formed by overlapping multiple objects, and is used to determine the content of the OR flag in the generation of the print job by the printer driver 110.

Configuration of Inkjet Recording Apparatus

As illustrated in FIG. 1, the inkjet recording apparatus 1 includes a scanning unit 101 which reads image information on an original as the print image and which outputs an image signal, a printing unit 102 which prints the print image on a print sheet based on the image signal outputted from the scanning unit 101, and the control unit 10 for overall control. The print sheet used in the printing of the print image in the printing unit 102 is conveyed from a not-illustrated sheet feeding unit to the printing unit 102, and then to a not-illustrated sheet delivery unit.

The external interfaces 15 of the multiple clients 14 are connected to the external interface 11 of the control unit 10 via a local area network LAN. Note that, in FIG. 1, only one of the clients 14 is described in detail as a representative. The control unit 10 receives the print job of the print image from each of the clients 14.

The control unit 10 generates raster data of the print image by using the received print job. Then, the inkjet recording apparatus 1 prints the print image onto the print sheet in the printing unit 102, under the conditions specified in the print, setting information of the print job.

A display 80 is connected to the control unit 10. The display 80 is arranged in an upper portion of the inkjet recording apparatus 1. The display 80 is used as a user interface of the inkjet recording apparatus 1. Specifically, the display 80 is used as, for example, an input operation unit and the like to which a user inputs copying conditions such as the number of copies and a copying magnification scale in copying and printing of the print image set in the scanning unit 101.

The control unit 10 of the inkjet recording apparatus 1 which causes the printing unit 102 to perform printing operations includes a CPU 90 (processor). The CPU 90 controls operations of the scanning unit 101 and the printing unit 102 according to contents set by being inputted from the display 80, based on a program and setting information stored in a ROM 91 (memory).

The control unit 10 is provided with a RAM 92. The RAM 92 stores the print job inputted into the control unit 10 from the client 14, various setting contents such as the number of copies in copying inputted from the display 80, and the like from time to time.

The PAM 92 is provided with a frame memory region. The print job from the client 14 and the raster data of the print image generated by the CPU 90 by using the image signal from the scanning unit 101 are temporarily stored in the frame memory region until the print job and the raster data are outputted to the printing unit 102.

The control unit 10 is provided with an external storage 93. The external storage 93 is connected to the CPU 90. The external storage 93 is provided with multiple regions for storing the print job transferred from the aforementioned RAM 92. Moreover, the external storage 93 stores various tables, counters, and the like.

Figure 4:
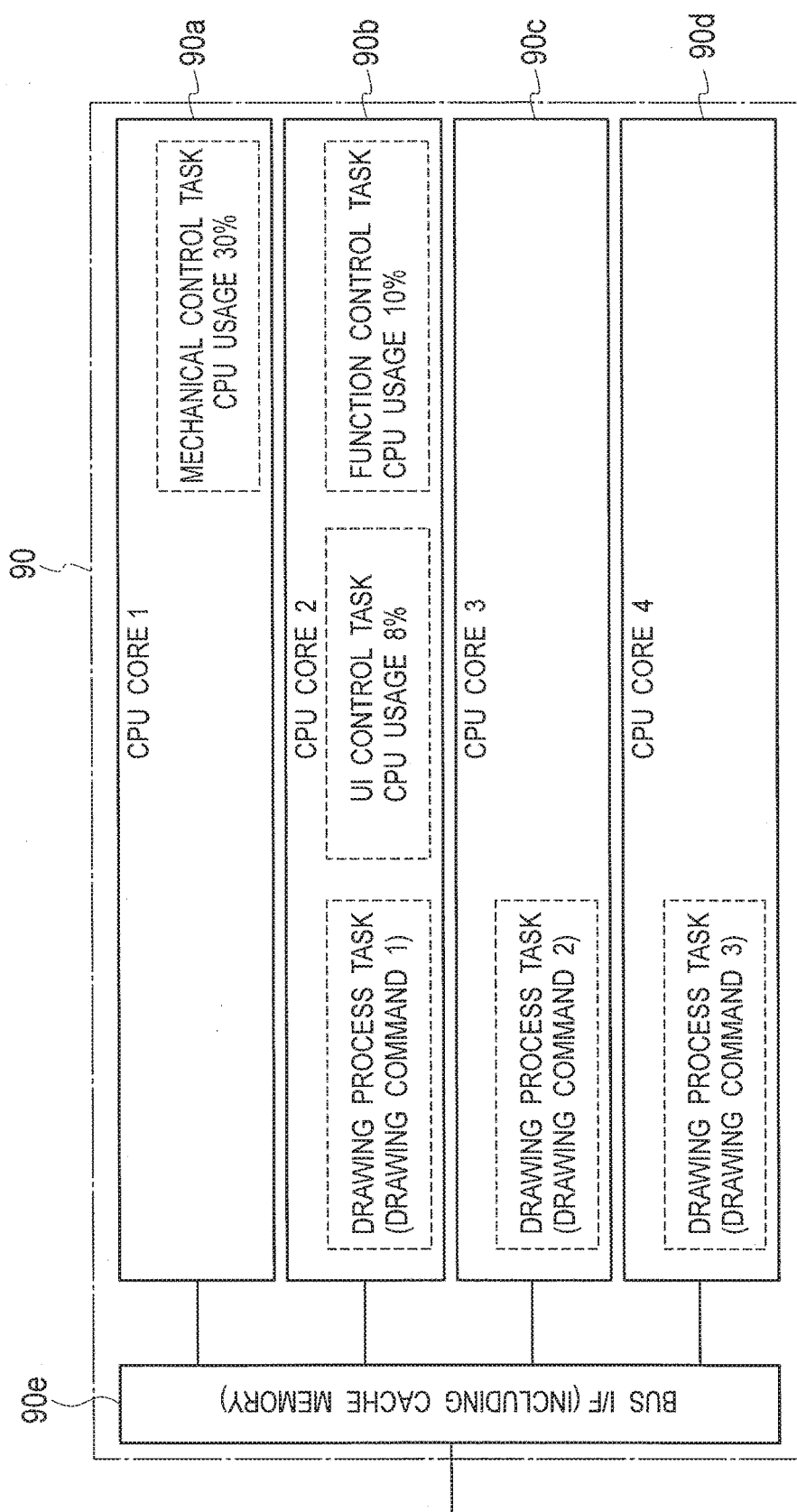
FIG. 4 is a block diagram illustrating a schematic configuration of a quad-core processor forming a CPU of a control unit in the inkjet recording apparatus of FIG. 1.

Note that, as illustrated in the block diagram of FIG. 4, the CPU 90 in the embodiment is a quad-core processor including four CPU cores 90a to 90d (arithmetic processors). Commands inputted into the CPU 90 are stored in a built-in cache memory included in an internal bus interface (I/F) 90e to be grouped into units of commands processed in the respective CPU cores 90a to 90d, and are distributed to the CPU cores 90a to 90d.

Print Process

With reference to the flowchart of FIG. 5, description is given below of processing procedures performed by the control unit 10 of the inkjet recording apparatus 1 when receiving the print job from the client 14.

Figure 5:
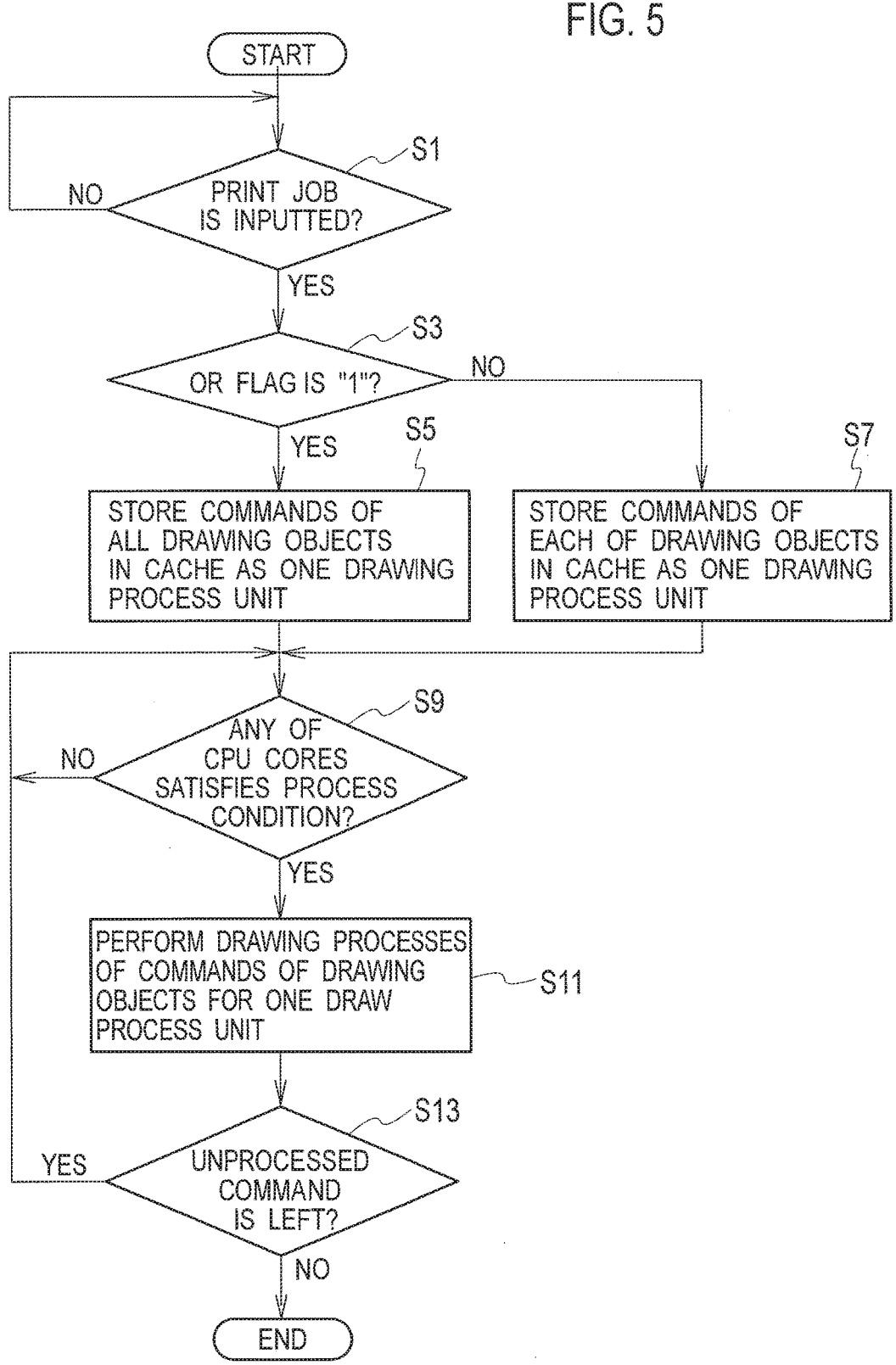
FIG. 5 is a flowchart depicting steps of a process performed by the CPU of the control unit in the inkjet recording apparatus upon receiving the print job with contents of FIG. 2 from the client of FIG. 1.

First, as illustrated in FIG. 5, when the print job from the client 14 is inputted (YES in step S1), one of the CPU cores 90a to 90d which performs user interface (UI) control in the CPU 90 of the control unit 10 (also referred to as the UI-controlling CPU core, below) determines whether the OR flag of the print job inputted via the bus I/F 90e is "1" (step S3).

When determining that the OR flag is not "1" (NO in step S3), the UI-controlling CPU core among the CPU cores 90a to 90d stores commands of drawing objects obj1, obj2, . . . of the print job in the built-in cache memory of the bus I/F 90e together as one drawing process unit such that the drawing processes for these objects are performed by one (single CPU core) of the CPU cores 90a to 90d Without changing the order (i.e. in the original order of the commands) (step S5).

Meanwhile, when determining that the OR flag is "1" (YES in step S3), the UI-controlling CPU core among the CPU cores 90a to 90d stores the commands of each of the drawing objects obj1, obj2, of the print job in the built-in cache memory of the bus I/F 90e as one drawing process unit respectively such that the commands of the drawing objects are processed by the separate CPU cores 90a to 90d in a distributed manner (step S7).

After the commands of the drawing objects obj1, obj2, . . . are stored in the built-in cache memory of the bus I/F 90e (YES in step S5 or S7), the UI-controlling CPU core among the CPU cores 90a to 90d determines whether any of the CPU cores 90a to 90d satisfies a process condition of the drawing objects obj1, obj2, . . . (step S9).

Whether each of the CPU cores 90a to 90d satisfies the process condition can be determined by, for example, determining whether a usage of each of the CPU cores 90a to 90d is below a reference value determined in advance such as 20%. When determining that none of the CPU cores 90a to 90d satisfies the process condition (NO in step S the UI-controlling CPU core among the CPU cores 90a to 90d repeats step S9.

Meanwhile, when determining that any of the CPU cores 90a to 90d satisfies the process condition (YES in step 39), the UI-controlling CPU core among the CPU cores 90a to 90d causes the CPU core 90a, 90b, 90c or 90d which satisfies the process condition to read the commands of the drawing objects obj1, obj2, . . . the cache memory from the command stored first, for one drawing process unit at a time, and perform the drawing processes (step S11).

In the case where two or more of the CPU cores 90a to 90d satisfy the process condition such as the case where the usages of two or more of the CPU cores 90a to 90d are equal to or lower than 201 in the determination of step S9, the drawing processes for the commands of the drawing objects obj1, obj2, . . . may be performed preferentially by, for example, a CPU core with the lowest usage among the CPU cores 90a to 90d in step S11.

Moreover, when the clock rates of the respective CPU cores 90a to 90d vary, for example, the drawing process of a command with a larger data amount out of the commands of the drawing objects obj1, obj2, . . . may be performed preferentially by a CPU core with a higher clock rate out of the CPU cores 90a to 90d.

Then, the UI-controlling CPU core among the CPU cores 90a to 90d determines whether any of the commands of the drawing objects obj1, obj2, . . . is left in the cache memory without being processed by the drawing process (step S13). When determining that such unprocessed command is left in the cache memory (YES in step S13), the UI-controlling CPU core among the CPU cores 90a to 90d returns to step S9. When determining that no such command is left in the cache memory (NO in step S13), the UI-controlling CPU core among the CPU cores 90a to 90d terminates the series of processes.

In the inkjet recording apparatus 1 of the embodiment configured as described above, the CPU 90 of the control unit 10 determines whether to execute the drawing processes for the drawing objects obj1, obj2, . . . of the print job described in the page description language (PDL) in parallel by using the separate CPU cores 90a to 90d, based on the content of the OR flag of the print job.

Accordingly, the CPU 90 can determine whether the OR drawing of multiple drawing objects is possible without bearing a burden of a large processing amount by performing analysis of determining whether the drawing objects in the print job intersect (overlap) each other on an image. Hence, the CPU 90 can determine whether the OR drawing of multiple drawing objects is possible without bearing the burden of a large processing amount, and increase the speed of the drawing processing for the drawing objects which can be subjected to the OR drawing, by causing the multiple CPU cores 90a to 90d to execute the drawing processes in parallel.

Second Embodiment

In the first embodiment, description is given of the case where the print, job includes the commands of the drawing objects obj1, obj2, . . . forming the image of the original being, the target of the print request for which the print job is generated.

In the second embodiment, as depicted in the explanatory view of FIG. 6 for example, the print job repeatedly includes, subsequent to the owner and the job name, a command of a drawing object obj which is a command of compressed raster data of one line in the image of the original and a command of vertical position (corresponding to the drawing position of the drawing object in Y coordinate axis direction) which is a drawing start position of the drawing object obj on the image in the vertical direction of the line, for each of the drawing objects.

When there are commands of vertical positions indicating the same drawing start position in the vertical direction of the drawing objects, the contents of the image may change depending on the order of drawing processes. Accordingly, in this case, the CPU 90 of the control unit 10 of the inkjet recording apparatus 1 performs the drawing processes for the case where the OR drawing is impossible, as in the case where the OR flag is "0" in the print job of FIG. 2.

Meanwhile, when there are no commands of vertical positions indicating the same drawing start position in the vertical direction of the drawing objects, there is no possibility of the contents of the image changing depending on the order of drawing processes. Accordingly, in this case, the CPU 90 of the control unit 10 of the inkjet recording apparatus 1 performs the drawing processes for the case where the OR drawing is possible, as in the case where the OR flag is in the print job of FIG. 2.

Specifically, as illustrated in the flowchart, of FIG. 7, UI-controlling CPU core among the CPU cores 90a to 90d in the CPU 90 of the control unit 10 receives the print job from the client 14 (YES in step S1) and determines, among the commands of all drawing objects obj1, obj2, . . . , whether any two or more of the commands have the same contents in the commands of vertical positions (vertical position 1, vertical position 2, . . . ), that is, whether there are commands of the same drawing start position in the vertical direction of the drawing objects (step S3').

When determining that there are commands of the same drawing start position in the vertical direction of the drawing objects (YES in step S3'), the UI-controlling CPU core among the CPU cores 90a to 90d stores the commands of the drawing objects obj1, obj2, . . . of the print job in the built-in cache memory of the bus I/F 90e together as one drawing process unit such that the drawing processes for these objects are performed by one of the CPU cores 90a to 90d without changing the order (step S5).

Meanwhile, when determining that there are no commands of the same drawing start position in the vertical direction of the drawing objects (NO in step S3') the UI-controlling CPU core among the CPU cores 90a to 90d stores the commands of each of the drawing objects obj1, obj2, . . . of the print job in the built-in cache memory of the bus I/F 90e as one drawing process unit such that the commands of the drawing objects are processed in the separate CPU cores 90a to 90d in a distributed manner (step S7).

Note that procedures hereafter are the same as the procedures in steps S9 to S13 described in the flowchart of FIG. 5.

In the inkjet recording apparatus 1 of the second embodiment configured as described above, the CPU 90 of the control unit 10 determines whether to execute the (drawing processes for the drawing objects obj1, obj2, in the print job described in the page description language (PDL) in parallel by using the separate CPU cores 90a to 90d, based on match or mismatch of the contents of the drawing positions of the drawing objects in the print job.

Accordingly, the CPU 90 can determine whether the OR drawing of multiple drawing objects is possible without bearing a burden of a large processing amount by converting the drawing objects of the print job from vector data to raster data and performing analysis of determining whether the drawing objects intersect each other. Hence, as in the inkjet recording apparatus 1 of the first embodiment, the CPU 90 can determine whether the OR drawing of multiple drawing objects is possible without bearing the burden of a large processing amount, and increase the speed of the drawing processing for the drawing objects which can be subjected to the OR drawing, by causing the multiple CPU cores 90*a* to 90*d* to execute the drawing processes in parallel.

Third Embodiment

When the print job is a job relating to a color original image and a print resolution varies among ink colors, as illustrated in the explanatory view of FIG. 8, commands of an ink color and a resolution are added to the print job described in the page description language (PDL), for each of the drawing objects of various colors in the print job to be drawn in the same page.

In the print job relating to the color original image, unlike the case where a monochrome image is formed by combining multiple drawing objects, no unfavorable changes occur in the contents of the drawn color image even when the order of drawing processes for the drawing objects forming the color image changes.

Accordingly, in the third embodiment, when there are drawing objects at the same drawing position, whether these drawing objects are related to the print job of the color original image is determined based on match or mismatch of the commands of the ink color. When the print job is determined to be related to the color original image, the drawing processes for the case where the OR drawing is possible are performed.

Figure 9:
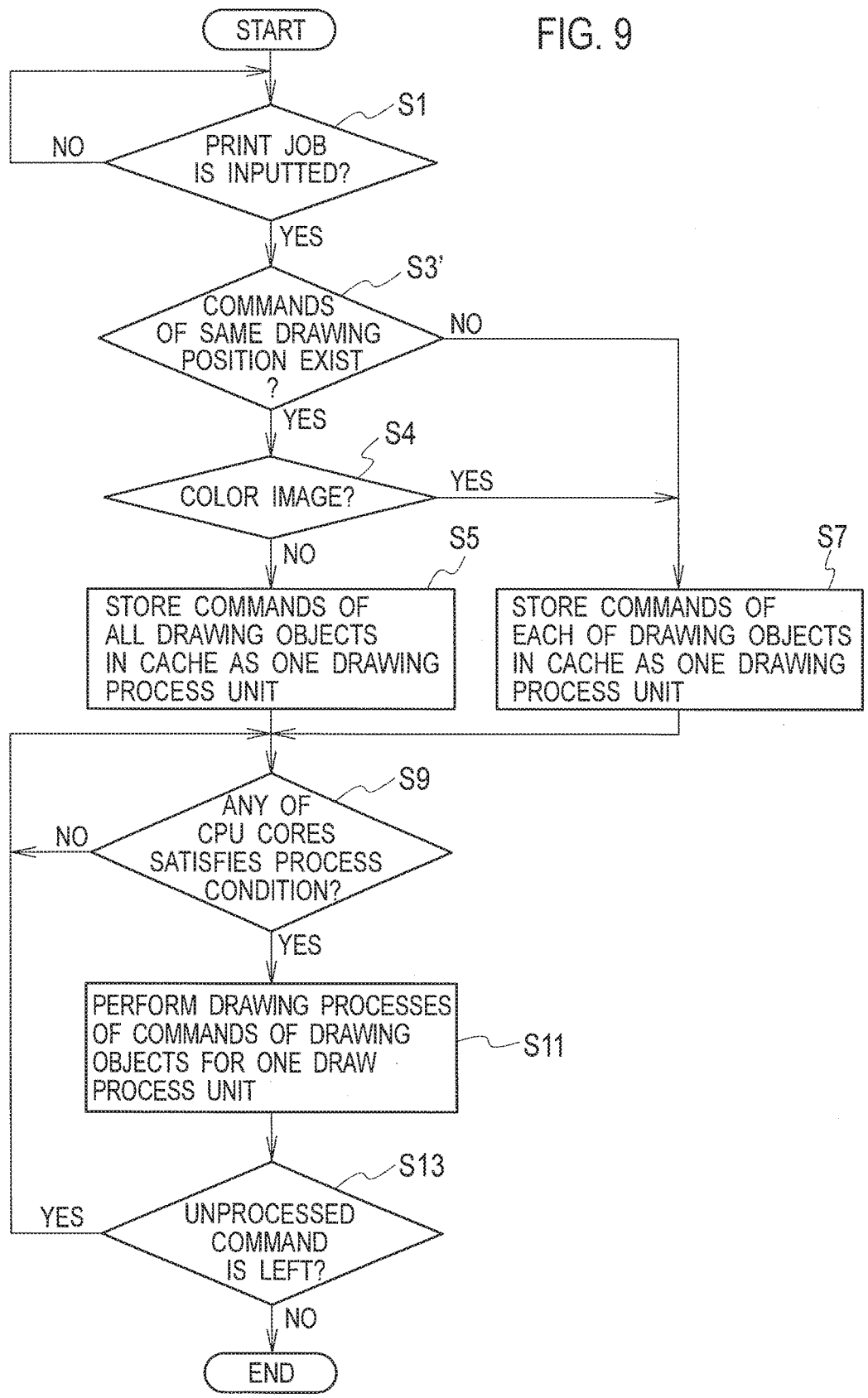
FIG. 9 is a flowchart depicting steps of a process performed by the CPU of the control unit in the inkjet recording apparatus upon receiving the print job with contents of FIG. 8 from the client of FIG. 1.

Specifically, when there are commands of drawing objects at the same drawing position in step S3' of the flowchart of FIG. 9 (YES), UI-controlling CPU core among the CPU cores 90*a* to 90*d* in the CPU 90 of the control unit 10 determines whether the inputted print job is a job relating to the color original image, based on the contents of the commands of the ink color (ink color information) corresponding to the drawing objects at the same drawing position as illustrated in the flowchart of FIG. 9 (step S4).

Then, when the print job is not a job relating to a color original image (NO in step S4), the UI-controlling CPU core among the CPU cores 90*a* to 90*d* causes the process to proceed to step S5. Meanwhile, when the print job is a job relating to a color original image (YES in step S4), the UI-controlling CPU core among the CPU cores 90*a* to 90*d* causes the process to proceed to step S7. Procedures in Step S5 and steps subsequent thereto are the same as the procedures in steps S5 to S13 described in the flowchart of FIG. 5.

In the inkjet recording apparatus 1 of the third embodiment configured as described above, the CPU 90 can determine whether the OR drawing of multiple drawing objects is possible without bearing a burden of a large processing amount by analyzing the drawing objects, for the print jobs relating to the color original image. Hence, as in the inkjet recording apparatus 1 of the first embodiment, to the CPU 90 can determine whether the OR drawing of multiple drawing objects is possible without bearing the burden of a large processing amount, and increase the speed of the drawing processes for the drawing objects which can be subjected to the OR drawing, by causing the multiple CPU cores 90*a* to 90*d* to execute the drawing processes in parallel.

Note that, when two or more of the CPU cores 90*a* to 90*d* with varying clock rates satisfy the process condition in the determination of step S9, for example, the drawing processes for the commands of the drawing objects obj1, obj2, . . . of the various colors which form the color original image and whose drawing positions are the same may be performed in step S11 such that the drawing process of the command of a drawing object with a higher resolution is performed preferentially by a CPU core with a higher clock rate out of the CPU cores 90*a* to 90*d*.

In the first to third embodiments, description is given of the case where the CPU 90 includes the four CPU cores 90*a* to 90*d*. However, the number of CPU cores included in one CPU may be other than four, such as two (dual core).

Moreover, the arithmetic processors may be, instead of the CPU cores, multiple CPUs formed of separate chips without sharing the interface, the cache memory, and the like.

Moreover, in the embodiments described above, description is given of the example in which the inkjet recording apparatus 1 is used as the image forming apparatus. However, the present disclosure is not limited to the case of using the inkjet method and can be widely applied to the case where a printer using a method other than the inkjet method such as an electrophotographic method is used as the image forming apparatus.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An image forming apparatus comprising:
   a processor having a plurality of arithmetic processors; and
   a memory including instructions that, when executed by the processor, cause the processor to perform operations including:
      receiving drawing data described in a page description language and including commands for a first drawing object and a second drawing object;
      determining whether a logical addition drawing operation of the first drawing object and the second drawing object is possible, based on contents of the commands of the received drawing data;
      upon determining that the logical addition drawing operation is not possible, driving one of the plurality of arithmetic processors to sequentially execute a first drawing process of the first drawing object and a second drawing process of the second drawing object in an original order of the first drawing object and the second drawing object in the commands of the received drawing data such that the image forming apparatus, in accordance with the sequential execution of the first drawing process and the second drawing process, prints a print image of the first drawing object and the second drawing object onto a print sheet; and upon determining that the logical addition drawing operation is possible, distributing and assigning the first drawing process and the second drawing process to two or more of the plurality of arithmetic processors and driving the two or more arithmetic processors to execute the first drawing process and the second drawing process in parallel such that the image forming apparatus, in accordance with the parallel execution of the first drawing process and the second drawing process, prints the print image of the first drawing object and the second drawing object onto the print sheet.

2. The image forming apparatus according to claim 1, wherein
the commands include status information indicating whether the logical addition drawing operation of the first drawing object and the second drawing object is possible, and
the operations include determining whether the logical addition drawing operation of the first drawing object and the second drawing object is possible, based on the status information.

3. The image forming apparatus according to claim 1, wherein
the commands include drawing position information indicating a first drawing position of the first drawing object and a second drawing position of the second drawing object, and
the operations include determining whether the logical addition drawing operation of the first drawing object and the second drawing object is possible, based on match or mismatch of the first drawing position and the second drawing position indicated in the drawing position information.

4. The image forming apparatus according to claim 1, wherein the operations include, upon determining that the logical addition drawing operation is possible, assigning the first drawing process and the second drawing process to the two or more arithmetic processors such that a drawing process of the first drawing process and the second drawing process with a larger data amount is assigned to an arithmetic processor of the two or more arithmetic processors with a higher clock rate.

5. The image forming apparatus according to claim 1, wherein
the first drawing object and the second drawing object are drawing objects of different colors forming a color image, and
the operations include, upon determining that the logical addition drawing operation is possible, assigning the first drawing process and the second drawing process to the two or more arithmetic processors such that a drawing process of the first drawing process and the second drawing process with a higher resolution is assigned to an arithmetic processor of the two or more arithmetic processors with a higher clock rate.

6. The image forming apparatus according to claim 1, wherein the operations include assigning the first drawing process and the second drawing process preferentially to the two or more arithmetic processors in an ascending order of usage of the two or more arithmetic processors.

7. The image forming apparatus according to claim 1, wherein
the commands include:
drawing position information indicating a first drawing position of the first drawing object and a second drawing position of the second drawing object; and
ink color information of the first drawing object and the second drawing object, and
the operations include:
determining whether the first drawing position and the second drawing position indicated in the drawing position information match;
upon determining that the first drawing position and the second drawing position match, determining whether the first drawing object and the second drawing object are drawing objects of different colors forming a color image, based on the ink color information; and
upon determining that the first drawing object and the second drawing object are the drawing objects of different colors, determining that the logical addition drawing operation is possible.

\* \* \* \* \*